United States Patent [19]
Kroha

[11] Patent Number: 4,933,079
[45] Date of Patent: * Jun. 12, 1990

[54] FUEL FILTER COUPLING

[75] Inventor: John L. Kroha, Ferndale, Mich.

[73] Assignee: Flexon, Inc., Ferndale, Mich.

[*] Notice: The portion of the term of this patent subsequent to Aug. 29, 2006 has been disclaimed.

[21] Appl. No.: 325,447

[22] Filed: Mar. 20, 1989

Related U.S. Application Data

[63] Continuation-in-part of Ser. No. 111,491, Oct. 22, 1987, Pat. No. 4,861,474.

[51] Int. Cl.$^5$ .............................................. B01D 23/00
[52] U.S. Cl. ................................... 210/232; 210/249; 210/416.4; 210/446; 210/238; 285/185
[58] Field of Search ............... 210/249, 232, 238, 237, 210/416.4, 446; 285/184, 185

[56] References Cited

U.S. PATENT DOCUMENTS

| | | | |
|---|---|---|---|
| 1,884,869 | 10/1932 | Replogle | 285/184 |
| 2,589,136 | 3/1952 | Ralston | 210/249 |
| 4,040,964 | 8/1977 | Hegyi | 210/238 |
| 4,452,695 | 6/1984 | Schmidt | 210/249 |

Primary Examiner—Steve Alvo
Attorney, Agent, or Firm—Basile and Hanlon

[57] ABSTRACT

A fluid coupling including a coupling base with a fluid passage therethrough, and a rotatable fluid line supporting bracket. The bracket is adjustable depending on the direction of fluid line approach, and is fixable once a desired configuration is determined. The fluid coupling base includes an annular groove in which the pipe support bracket is rotatably engaged. The bracket may be fixed in position once a desired configuration is obtained, thus fixing the bracket in supporting relationship with the fluid line.

5 Claims, 4 Drawing Sheets 4,933,079

FUEL FILTER COUPLING

CROSS-REFERENCES TO RELATED APPLICATIONS

This application is a continuation-in-part of U.S. Ser. No. 07/111,491 filed on Oct. 22, 1987, now U.S. Pat. No. 4,861,474.

BACKGROUND OF THE INVENTION

1. Field of the Invention

The present invention is concerned with a fluid coupling of the type used with high pressure fluid lines for connection to fluid filters.

2. Description of the Relevant Art

Such couplings are finding increasing usage in automobiles having fuel injection systems which require high pressure in the fuel system. Generally, the couplings will incorporate a fuel line support for incoming or outgoing fuel lines. Prior couplings of this type have fuel line supports incorporated into the couplings which are fixed, during manufacture, in a position determined by the specific application in which the filter or other device is to be installed. Fixed couplings of this type necessitate numerous replacement filter configurations, each having differently configured end fittings to match the fluid line configuration, which generally varies with each application.

The present invention is directed to a universal fluid coupling having fluid line supports which are adaptable to all supply line configurations and which may be fixed in position following adaptation, thus eliminating the need to manufacture and supply a differently configured fuel filter for each application.

SUMMARY OF THE INVENTION

In accordance with the present invention, a fluid coupling for use wth a fluid filter comprises a tubular fluid coupling base member with a pipe support bracket attached thereto for supporting an incoming or outgoing fluid line. The bracket is adjustable to accommodate fluid lines of varying configuration, and may be fixed in position once a desired configuration is determined.

The fluid coupling base is tubular to accommodate passage of fluid therethrough, and is formed with an annular groove, disposed about its external perimeter, adjacent its outermost end. The pipe support bracket is mounted for rotational movement about the longitudinal axis of the coupling base. The pipe support bracket, which is preferably U-shaped, is formed with its internal radius having an aperture formed therein, with a diameter corresponding to the circumference of the annular groove so as to allow a loose fit within the groove. A series of teeth may be formed within the aperture to provide high friction between the bracket and the coupling base allowing the bracket to be fixed in position. The ends of the U-shaped bracket are spaced apart and are formed to encompass at least a portion of the outer surface of a fluid line when the bracket is correctly positioned. The ends of the U-shaped bracket may be moved toward each other in a crimping action, thereby effectively tightening the bracket about the coupling base and the fluid line, thus effectively supporting the fluid line and fixing the bracket in position about the fluid coupling base. The rotatable mounting of the pipe support bracket about the base allows the bracket to be positioned to accommodate all fluid line configurations, thus eliminating the need for multiple fluid filter configurations.

In a second embodiment, the tubular fluid coupling base has a bracket retaining portion adjacent to, and extending longitudinally inwardly from, the outermost end. The retaining portion is located about the external surface of the base member and comprises a first portion, directly adjacent to the second end, which is of a reduced diameter. Additionally, a second portion, disposed adjacent to and longitudinally inwardly from the first portion, has a diameter less than the first portion. A third portion, disposed adjacent to and longitudinally inwardly from the second portion, has a diameter larger than the second portion and has a plurality of flat surfaces which form a polygonal shape about the circumference of the base member.

The pipe support bracket is a one-piece, generally plate-like member which has an aperture formed at one end. A plurality of flat surfaces which form a polygonal shape are formed about the circumference of the aperture. The aperture, in the supporting bracket, is configured to pass over the first and second end portions of the bracket retaining portion and to slidingly engage the third portion in a non-rotatable relationship to the coupling base. In this configuration, the bracket provides support for a fluid line which is attached to the second end of the base member. A flanged portion extends outwardly from the bracket at a location extending radially from, and tangentially to, the polygonal aperture in the bracket. A fluid line engaging recess, formed in the flanged portion is configured to support the fluid line about its external surface. Means are provided for fixing the supporting bracket axially in relation to the third, polygonal shaped portion. Should it be desirable to have an additional fluid line support bracket or a mounting bracket disposed about the coupling base, the third portion is axially extended to accept more than one bracket in sliding engagement therewith.

Other objects and features of the invention will become apparent by reference to the following specification and to the drawings.

DETAILED DESCRIPTION OF THE PREFERRED EMBODIMENTS

Figure 1:
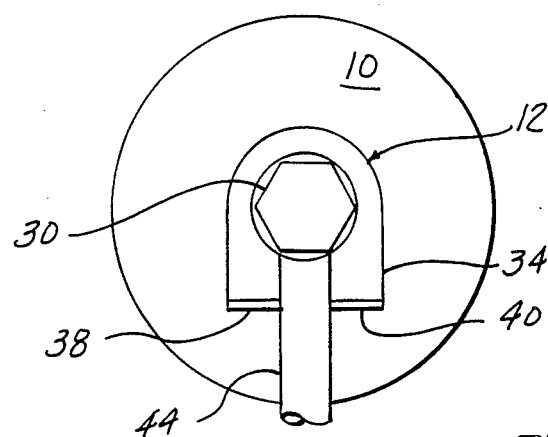
FIG. 1 is a top view showing a fuel filter with a coupling embodying the present invention installed and fixed in position.
Figure 2:
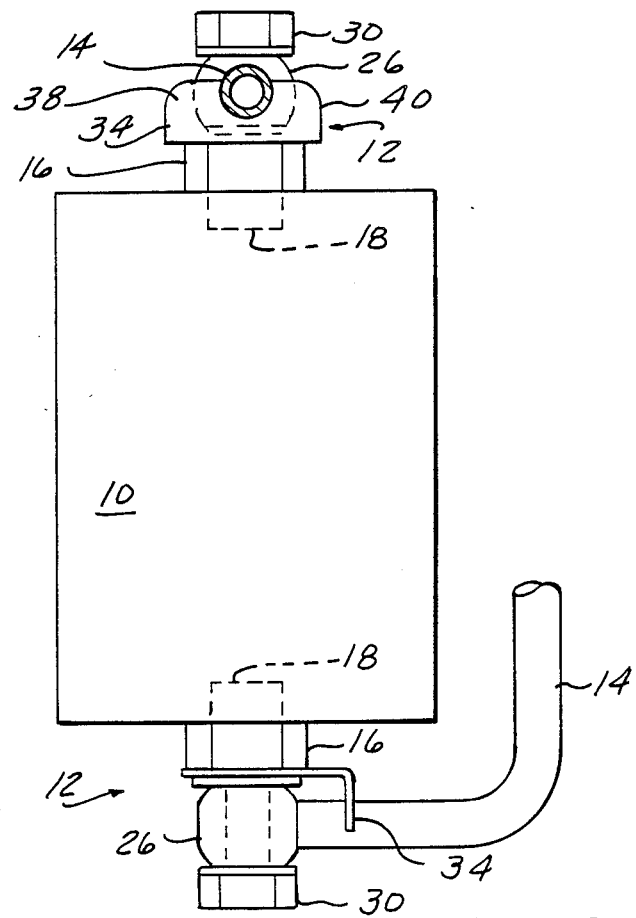
FIG. 2 is a front elevational view showing a fuel filter with a coupling, disposed at each end thereof, embodying the present invention and fixed in position at different angles relative to each other.
Figure 3:
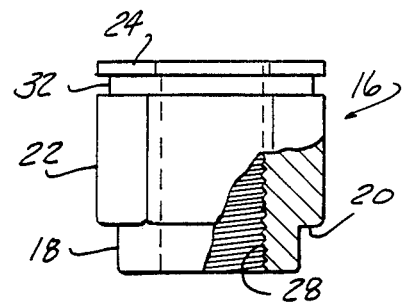
FIG. 3 is a front elevational view, partially broken away, of a fluid coupling base.
Figure 4:
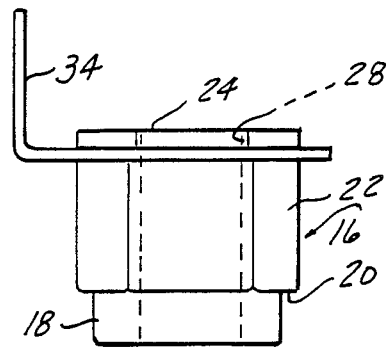
FIG. 4 is a front elevational view of the fluid coupling base of FIG. 3 with a pipe support bracket installed.

In FIGS. 1 and 2 there is shown a typical installation employing the fluid coupling of the present invention. A conventional fluid filter 10 is provided with a fluid coupling, designated generally as 12, connected between a fluid line 14 and the filter 10. A tubular fluid coupling base 16, shown in detail in FIGS. 3 and 4, has a first end portion 18 for engagement with fluid filter 10. The first end portion 18 comprises a reduced diameter annular section for insertion into an aperture formed in fluid filter 10. The annular end portion 18 extends longitudinally inwardly along the axis of the fluid coupling base to adjoin shoulder 20. Shoulder 20 has a larger external radius than does annular end portion 18, and acts as a stop to effectively limit entry of the fluid coupling base 16 into the fluid filter aperture.

External contacting surfaces 22, disposed between shoulder 20 and a second end portion 24, are provided for engagement with standard wrench type tools. Such tools may be used when assembling the various portions of the fluid coupling. Second end portion 24 of fluid coupling base 16 engages a conventional fluid fitting 26 connected to the end of fluid line 14.

The coupling base 16 has a bore 28 extending longitudinally therethrough, for passage of fluid when fluid line 14, fluid fitting 26, and coupling base 16 are sealingly engaged with fluid filter 10 by means of threaded bolt 30 shown in FIG. 2.

Figure 5:
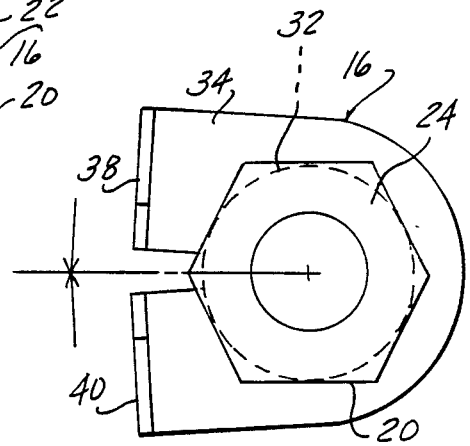
FIG. 5 is a top view showing the fluid coupling base of FIG. 4 with a pipe support bracket installed, prior to the bracket being fixed in position.

Adjacent to second end portion 24 of coupling base 16, an annular groove 32 is formed around the external perimeter thereof. A U-shaped pipe support bracket 34 is mountable within the groove 32 for rotational movement about the longitudinal axis of the coupling base 16. The internal radius of the U-shaped bracket 34 has an aperture 36, shown in FIGS. 5 and 6, having a diameter corresponding to the circumference of the annular groove 32. A series of teeth 37 may be disposed about the circumference of the aperture 36 for frictional engagement with the surface of annular groove 32 when the bracket is fixed into position as will be further described below. Ends 38, 40 of the U-shaped bracket 34 are spaced apart, as shown in FIG. 5, to allow the bracket 34 a loose initial fit within the annular groove 32. The loose initial fit allows the bracket 34 to be rotated about the axis of the fluid coupling base 16, thereby permitting easy and correct positioning of the bracket 34 into a supporting relationship relative to fluid line 14 as shown in FIGS. 1 and 2.

The bracket ends 38, 40 are configured to encompass at least a portion of the outer surface of a fluid carrying line 14, as shown in FIG. 2, when the ends 38, 40 are moved towards one another in a crimping action. The configuration of the bracket ends 38, 40 may vary depending upon the shape of the particular fluid line 14.

Figure 6:
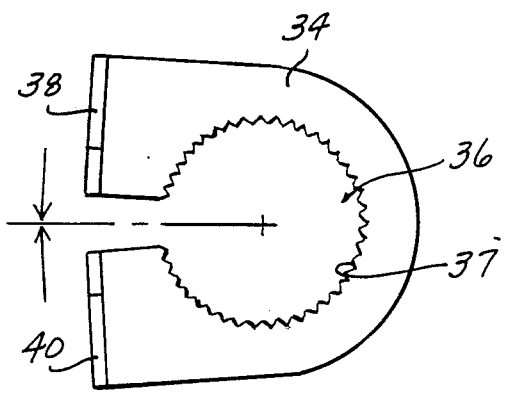
FIG. 6 is a top view of a pipe support bracket in an uncrimped configuration.
Figure 7:
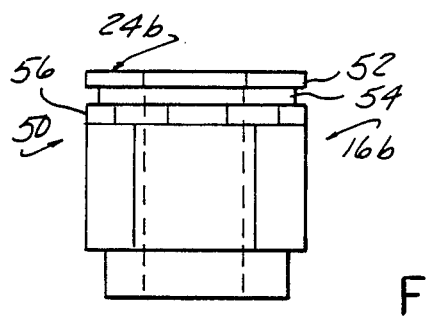
FIG. 7 is a front elevational view of a second embodiment of a fluid coupling base.
Figure 8:
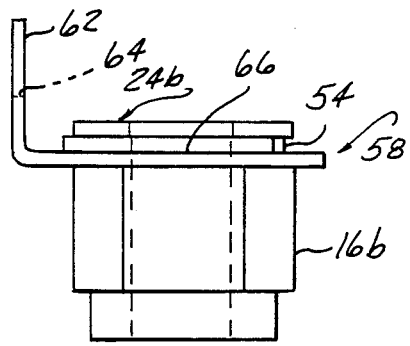
FIG. 8 is a front elevational view of the fluid coupling base of FIG. 7 with a pipe support bracket installed.
Figure 9:
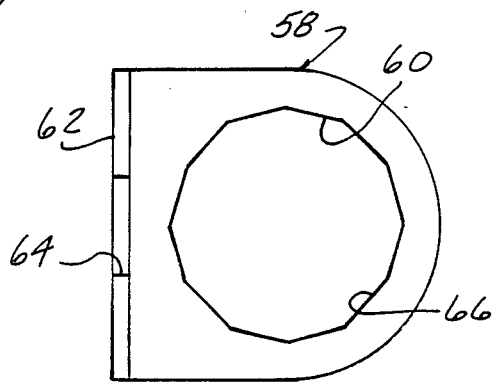
FIG. 9 is a top view of the second embodiment of the pipe support bracket.
Figure 10:
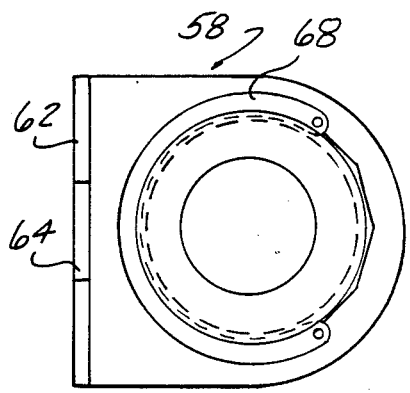
FIG. 10 is a top view showing the fluid coupling base of FIG. 8 with a pipe support bracket installed.
Figure 11:
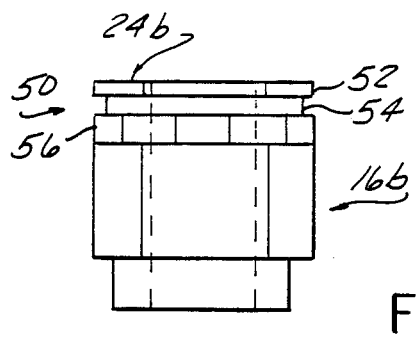
FIG. 11 is a front elevational view of a third embodiment of a fluid coupling base.

The ends 38, 40 of the U-shaped bracket 34 are movable relative to each other into adjacent relationship therewith as indicated in FIGS. 2, 5 and 6. This crimping-like action will act to close aperture 36 about the annular groove 32, thereby engaging the teeth 37 with the surface of annular groove 32 to fixedly position the pipe support bracket 34 in a desired, preselected position. Additionally, as the ends 38, 40 of the U-shaped pipe support bracket are moved together, the bracket ends 38, 40 move into a supporting relationship about the exterior surface of fluid line 14. The bracket design disclosed in this first embodiment allows the coupling to be universally adaptable to any fluid line configuration, thus eliminating the need for the same type of fluid filter to be manufactured with multiple configurations of end fittings for different applications.

In use, the brackets are first rotated in to approximate position for installation using the old filter, or the fluid line position of the particular application, as a guide. The filter is then positioned in its desired application, using standard mounting hardware, and the fluid coupling is assembled, making sure that the fluid line supporting brackets are positioned so that the bracket ends straddle the perimeter of the fluid line. Once the U-shaped pipe support brackets are in their desired configurations, the bracket ends are moved together in a crimping action, through the use of a plier or "Vise-Grip" tool, thus effectively fixing the brackets in position on the fluid coupling base and in a supporting relationship to the fluid line.

A second and third embodiment of the fluid coupling of the present invention is shown in FIGS. 7 through 14, and is described below. Adjacent to second end 24b of coupling base 16b is bracket retaining portion 50. Bracket retaining portion 50 extends longitudinally inwardly from second end 24b about the external surface of base member 16b. A first portion 52 is positioned directly adjacent to second end 24b. A second portion 54, adjacent to first portion 52, extends longitudinally inwardly from the first portion 52, and has a diameter less than first portion 52. A third portion 56 lies adjacent to and longitudinally inwardly from second portion 54 and is of a diameter larger than the second portion 54. Third portion 56 has a plurality of flat surfaces which form a polygonal shape about the circumference of base member 16b.

A supporting bracket 58 is formed from a generally plate-like member and has an aperture 60 formed therein having a plurality of flat surfaces 66 which form a generally polygonal shape. The aperture 60 formed in support bracket 58 is configured to pass over the first and second portions 52 and 54 of bracket retaining portion 50 and to slidingly engage third portion 56 in a non-rotatable relationship about the longitudinal axis of coupling base member 16b.

Figure 12:
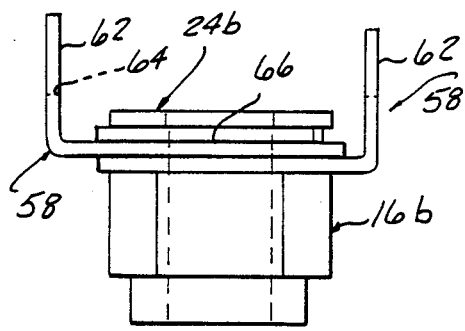
FIG. 12 is a front elevational view of the fluid coupling base of FIG. 11 with pipe support brackets installed.
Figure 13:
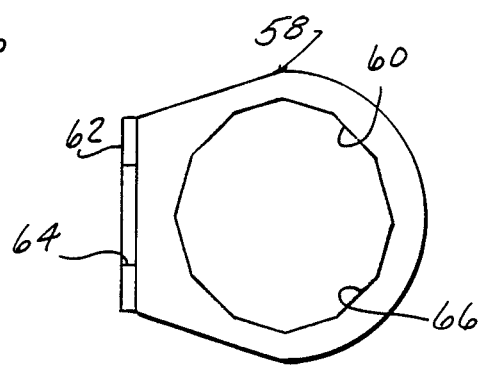
FIG. 13 is a top view of the third embodiment of the pipe support bracket.
Figure 14:
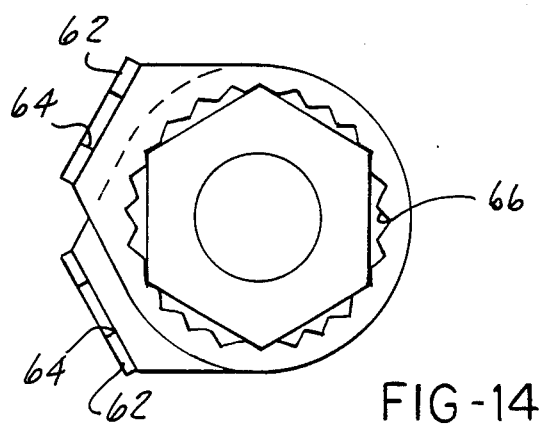
FIG. 14 is a top view showing the fluid coupling base of FIG. 12 with pipe support brackets installed.

Support bracket 58 has a flanged end portion 62 which extends outwardly from the bracket at a location radially outwardly from, and tangential to, aperture 60. The flanged end portion 62 is located a radial distance which is large enough to allow more than one bracket to be placed over the third portion 56, as indicated in FIGS. 12 and 14, without the flange on the lower bracket interfering with the plate portion of the adjacent bracket. A fluid line engaging recess 64 is formed in flanged end portion 62 and is configured to support a fluid line which is attached to second end portion 24b when the coupling 16b is in use.

Means for fixing support bracket 58 in axial engagement with third portion 56, thereby preventing rotation about the longitudinal axis of coupling base member 16b and axial movement along the axis of base member 16b, may be provided. The fixing means may comprise a biasing retainer such as circlip 68 which is engageable within the reduced diameter second portion 54 thereby preventing bracket 58 from axial movement off of polygonally shaped third portion 56.

In use, filter 10 is positioned in its desired application and a support bracket 58 or multiple brackets, depending on the application, are placed over bracket retaining portion 50 and into engagement with third portion 56 so that fluid line engaging recess 64, formed in flanged end portion 62, is in supporting alignment with a fluid line to be attached to the second end 24b of coupling base 16b. Once support bracket 58 is in proper alignment, its aperture 60 is slidably engaged with third portion 56. Engagement of support bracket 58 with third portion 56 will lock the bracket in non-rotatable position relative to coupling member 16b. The number of flat surfaces 66 which are formed in aperture 60 will determine the degree of rotational adjustment. As shown in FIG. 14, a large number of flat surfaces 66 will allow small rotational adjustments. Subsequently, circlip 68 is engaged with second portion 54 to fixedly lock support bracket 58 in axial position on coupling base member 16b.

While one embodiment of the invention has been described in detail above in relation to filter application, it will be apparent to those skilled in the art that the disclosed embodiment may be modified. Therefore, the foregoing description is to be considered exemplary rather than limiting, and the true scope of the invention is that defined in the following claims.

I claim:

1. A fluid coupling useful for coupling a fluid line to a fluid filter, said coupling comprising:
   a one-piece, longitudinally extending, tubular coupling base member having a first end for engagement with a fluid filter, and having a second end configured for engagement with the fluid line;
   a bracket retaining portion formed about the external surface of the base member, adjacent to and extending longitudinally inwardly from said second end, comprising a first portion adjacent to said second end, having a reduced diameter, a second portion adjacent to and longitudinally inwardly from said first portion having a diameter less than said first portion, and a third portion adjacent to and longitudinally inwardly from said second portion having a diameter larger than said second portion and having a plurality of flat surfaces forming a polygonal shape about the circumference of said base member;
   a support bracket, mountable to said tubular coupling base member, comprising a generally plate-like member having an aperture formed therein, said aperture having a plurality of flat surfaces forming a polygonal shape configured to engage said third portion of said bracket retaining portion, said aperture configured to pass over said first and said second portions of said bracket retaining portion and to slidingly engage said third portion in a non-rotatable relationship to the longitudinal axis of said base member;
   a flanged end portion extending outwardly from said support bracket at a location radially outwardly from, and tangentially to, said polygonal aperture, and having a fluid line engaging recess, formed in said flanged portion, configured to engage a fluid line about a portion of its external surface; and
   means for fixing said support bracket in axial engagement with said third, polygonally shaped portion thereby locking said bracket into a non-rotatable position.

2. A fluid coupling useful for coupling a fluid line to a fluid filter, as defined in claim 1, wherein said fixing means comprises a biasing retainer which is engageable within the reduced diameter of said second portion thereby preventing said bracket from movement axially of said third portion.

3. A fluid coupling useful for coupling a fluid line to a fluid filter, as defined in claim 1, wherein said third portion has an axial length sufficient to accommodate more than one support bracket in a stacked, axially adjacent configuration.

4. A fluid coupling useful for coupling a fluid line to a fluid filter, as defined in claim 3, wherein more than one support bracket is mounted in a stacked, axially adjacent configuration.

5. A fluid coupling useful for coupling a fluid line to a fluid filter, as defined in claim 1, wherein the
   flat surfaces forming said polygonal shape are sized to permit a predetermined
   degree of rotational adjustability of said bracket about the longitudinal axis of said coupling base member.

* * * * *